Figure 1:
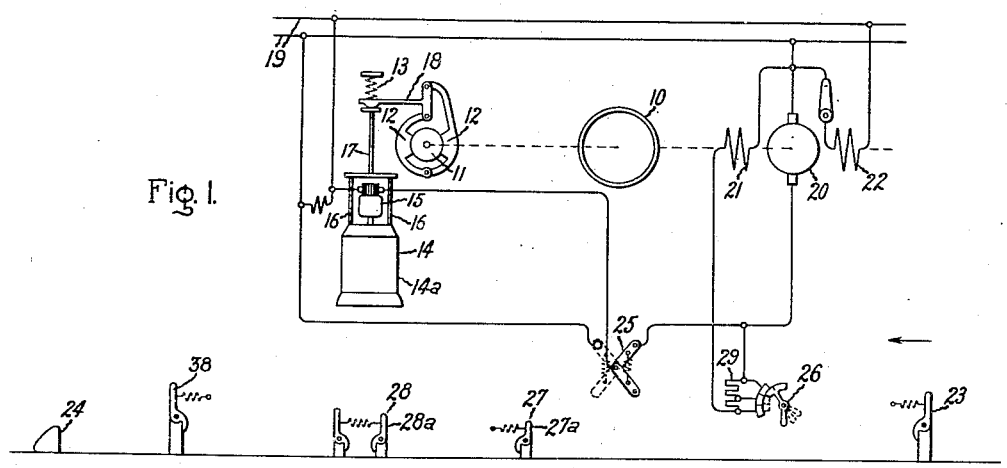

Dec. 12, 1939.   K. SCHIEBELER   2,183,409
END ZONE RETARDATION CONTROL SYSTEM
Filed Feb. 5, 1938

Inventor:
Karl Schiebeler,
by Harry E. Dunham
His Attorney.

Patented Dec. 12, 1939

2,183,409

UNITED STATES PATENT OFFICE 2,183,409

END ZONE RETARDATION CONTROL SYSTEM

Karl Schiebeler, Berlin-Charlottenburg, Germany, assignor to General Electric Company, a corporation of New York Application February 5, 1938, Serial No. 188,990
In Germany February 15, 1937

5 Claims. (Cl. 188—182)

This invention relates to control systems, more particularly to systems for controlling the braking of traveling cranes, loading bridges and their trolley carriages and the like apparatus, and it has for an object the provision of a simple, reliable, and improved system of this character.

In the case of electrically operated driving gears with large movable parts, such for example as rapidly traveling crabs and cranes or loading bridges, etc., retardation braking is necessary.

In the free running zone of the track, this retardation is usually effected by means of electrical braking under the control of the operator. In the end zone, however, the control may be taken away from the operator and effected automatically in order to prevent damage to the apparatus. This is usually accomplished by arranging the control so that a limit switch is actuated to disconnect the motor and apply the brake as the apparatus enters the end zone. The length of the end zone is so chosen that if the apparatus enters the end zone at maximum speed, the brake will bring the apparatus to a stop at the buffers arranged at the end of the end zone. Since the kinetic energy stored in the apparatus which must be dissipated by the brake varies with the square of the speed, the length of the slow down path also varies with the square of the speed. Consequently, if the apparatus enters the end zone at low speed, the length of the slow down path is greatly shortened and the driving gear is brought to standstill prematurely and at a distance from the buffers that varies inversely with the square of the speed at which the apparatus entered the end zone. Therefore, in order to complete the movement of the apparatus to the buffers at the end of the end zone, it is necessary to reenergize the driving motor.

For this purpose, it is necessary to provide the master switch with one or more switching positions in order to provide for release of the brake and reconnection of the motor to the source for rotation in the same direction as previously, to complete the run to the end buffers after the response of the end zone entrance limit switch.

This is usually accomplished by arranging the control so that when the master switch is in one of the low speed positions, the end zone entrance limit switch is rendered ineffective. With such an arrangement it is possible for the operator by a timely switching of the master switch to one of these positions as the apparatus enters the end zone to trick the control and prevent disconnection and application of the brake or at least to effect a very rapid release of the brake and reconnection of the motor. The drive when unbraked or braked an inconsiderable amount, may thus travel through the end zone with sufficient speed and force to demolish the buffers, pass off the end of the track, and wreck itself.

Accordingly, an object of the present invention is the provision of means for eliminating the foregoing disadvantages.

In carrying the invention into effect in one form thereof, electro-hydraulic brake operating means are provided which are regulated in dependence upon the speed and the length of the end zone to be traveled.

Figure 2:
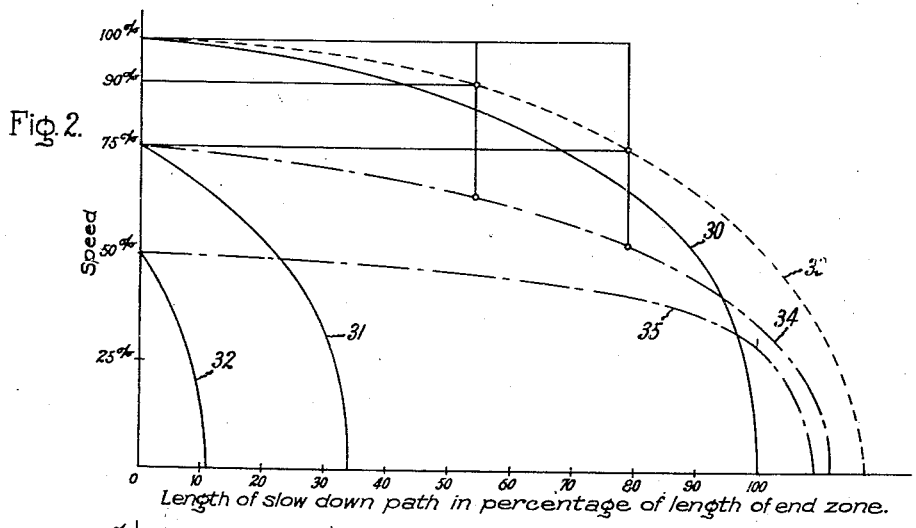
Figure 3:
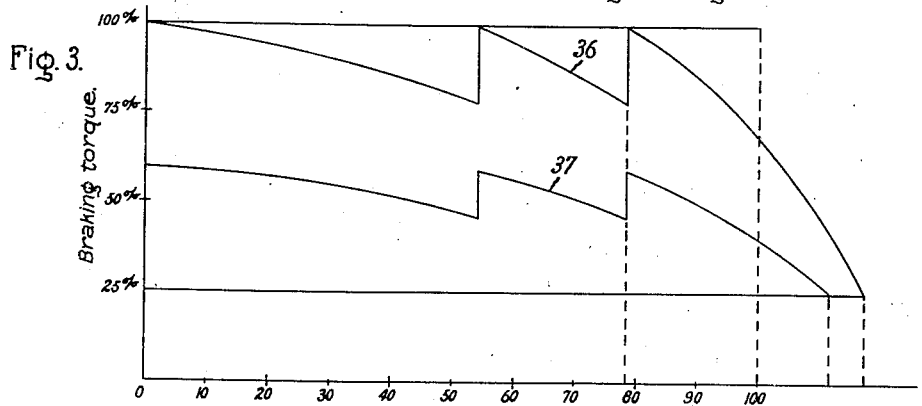

For a better and more complete understanding of the invention, reference should now be had to the following specification and to the accompanying drawing in which Fig. 1 is a simple, schematic diagram of an embodiment of the invention, and Figs. 2 and 3 are charts of characteristic curves which explain the operation.

Referring now to the drawing, a wheel 10 of the traveling gear runs on a rail (not shown) and is connected through suitable driving connections to the driving motor (not shown). A brake drum 11 is mechanically connected to the wheel 10. Brake shoes 12 are normally set against the drum by suitable means such as spring 13, and the braking force of the shoes against the drum is regulated by an electro-hydraulic device 14 when the apparatus is in the end zone. Although any suitable electro-hydraulic brake operating means may be utilized, a device such as the electro-hydraulic operator disclosed in United States Patent No. 2,036,798 Driesch is preferred. This device comprises a cylinder 14a which contains a liquid such as oil, a movable piston, and a liquid impeller driven by means of an electric motor 15. The piston is connected through push rods 16 and 17 to the brake shoe operating lever 18.

When the motor 15 is deenergized, the impeller is at rest and no fluid pressure is developed in the cylinder 14. On the other hand, when the motor 15 is energized, a fluid pressure is developed and the piston is raised and applies a force to move the brake operating lever 18 against the force of the spring 13 in a direction to release the brake shoes. The magnitude of this releasing force depends upon the fluid pressure exerted against the piston which in turn depends upon the speed of the motor 15. Thus by varying the speed of motor 15, the braking force can be regulated.

The armature of impeller motor 15 is connected to a suitable source of supply represented by supply lines 19 in series relationship with the armature of a control dynamo-electric machine 20 which is mechanically connected to the axle of wheel 10. Machine 20 is provided with a self-excited field winding 21 and a separately excited field winding 22 of relatively weak excitation. The armature of machine 20 is so connected in the series circuit that its voltage adds to the counter-voltage of motor 15 and opposes the voltage of source 19. A limit device 23 is arranged at the entrance to the end zone, and the buffer 24 is mounted at the end of the end zone. A suitable switching device 25, illustrated as a snap action, over-center switch cooperates with limit device 23 to connect the armature of control machine 20 in series relationship between the armature of motor 15 and the source when the apparatus enters the end zone. Similarly, a suitable switching device 26 cooperates with actuating devices 27 and 28 to short-circuit resistor 29 in the self-excited field circuit of control machine 20 so as to vary its voltage in accordance with the position of the apparatus in the end zone, i. e., in accordance with the amount of the end zone remaining to be traveled.

Switch 25 is illustrated in the position which it occupies after the apparatus has entered the end zone. Prior to entrance into the end zone, switch 25 occupies the position shown in dotted lines and connects the armature of impeller motor 15 directly to the source 19, as a result of which the motor 15 operates at maximum speed, and maximum fluid pressure is exerted against the piston to effect complete release of the brake. As the apparatus enters the end zone, switch 25 engages limit device 23 and is snapped from its dotted line position to its full line position as shown. It is usual, as stated in the foregoing, to arrange the control so that the limit switch 25 disconnects the driving motor from the source and sets the brake as the apparatus enters the end zone. Since this in itself is not a novel feature, it is not illustrated in the drawing.

The greater the speed of the apparatus the greater will be the voltage of the control machine 20, and therefore the smaller will be the voltage applied to motor 15, (since only the difference between line voltage and the voltage of machine 20 is applied to motor 15) and the smaller will be the lifting force of the electro-hydraulic mechanism and the greater will be the braking force of the shoes 12 against drum 11. On the other hand, with the speed of the apparatus becoming lower, the lifting force of the electro-hydraulic mechanism will increase because the voltage of machine 20 is correspondingly decreased, and the braking force is correspondingly decreased. In other words, the braking force of the mechanical brake is graduated in accordance with the speed of the apparatus when in the end zone.

It will readily be seen that this arrangement results in a longer slowing down path as compared with the slowing down path of apparatus having an unregulated brake which is fully applied upon entering the end zone and remains fully applied because in the improved system, the braking energy decreases with the decrease in speed. If the apparatus enters the end zone at low speed, as is frequently the case when traveling over short distances prior to entering the end zone, then a correspondingly reduced braking force is effective from the instant of entering the end zone, which results in a correspondingly smooth braking, so that the driving gear no longer prematurely comes to a stop as heretofore, but in this case also can run as far as the buffers. These conditions are represented in Fig. 2, in which curves 30, 31, and 32 illustrate the relationship between speed of the apparatus entering the end zone and length of the slow down path in percentage of length of the end zone when braking by the prior art method, and curves 33, 34 and 35 represent the same relationships when braking by the improved method of the invention. It is to be observed that when constant full braking torque is used, a slight decrease in speed of entering the end zone results in greatly shortening the slow down path; the driving gear stops before traveling half the length of the end zone, and the driving motor must be reenergized in order to travel to the end of the end zone. With the improved arrangement of the invention, on the other hand, braking at less than full speed is effected with less braking torque and thereby the same slowing down path is obtained as in the case of full speed.

The arrangements previously described would be entirely satisfactory if the braking torque were directly proportioned to the speed of the apparatus from 100% speed to zero speed. Such, however, is not the case. The entire range of lifting force of the electro-hydraulic lifting apparatus, and consequently the entire range of the braking torque lies within a much narrower speed range, approximately between 70–90% of the speed at which the brake is fully released. Fig. 3 shows how this problem is solved. On curve 30 in Fig. 2 each point in the end zone corresponds to a predetermined speed of the apparatus.

At a point about half way in the end zone corresponding to a speed of approximately 75% to 80% of full speed, the retardation switch 26 engages the stop 27a and is actuated from the full line position in which it is shown to the first dotted line position in which it short circuits one section of resistor 29 thereby to increase the excitation of control machine 20. This increases the voltage of machine 20 and decreases the speed of impeller motor 15, thereby reducing the brake releasing force of the electro-hydraulic mechanism and again increasing the braking torque applied to the drum. At a further point in the end zone the switch 26 engages stop 28a and the foregoing action is repeated. These operations are represented by the curve 36 in Fig. 3. If the speed of the impeller motor had not been reduced at these intermediate points the braking torque would have been reduced to zero before the apparatus had traversed half the length of the end zone.

As the apparatus approaches the buffer at low speed, switch 25 passes over actuating device 38 by rotating the upper movable member in a counterclockwise position against the force of the positioning spring. When the apparatus has passed, the spring returns the movable member to the position in which it is shown. The apparatus finally comes to rest against the buffer. When operations in the end zone are completed, the master switch (not shown) is actuated to energize the crane driving motor in the reverse direction. As the apparatus leaves the buffer, switch 25 engages actuating device 38. Since the upper movable member of this device cannot rotate in a clockwise direction, the switch is actuated from the position in which it is shown to the dotted line position in which motor 15 is connected directly to the supply source and the brake is fully released.

If the apparatus enters the end zone at a lower speed, the operation is represented by curve 37 in Fig. 3.

When entering the end zone at low speeds, the brake is fully released and produces no braking torque. After the driving motor is disconnected, only the frictional resistances of the driving gear are effective for braking, so that the end zone is traversed with correspondingly less reduction in speed.

Although a direct current control system is disclosed for the purpose of illustration, it will be understood that the invention includes alternating current systems in which the impeller of the electro-hydraulic mechanism is driven by an alternating current motor connected to the source through a frequency converter mechanically connected to the shaft of the driving gear through a variable speed transmission which is adjusted through the retardation switch lever. In the case of three-phase current drives a direct current control machine can also be utilized and this can be operated through dry rectifiers or other converters from the three-phase system as described in connection with the system of Fig. 1.

The effect of the braking can be obtained without jerking and sliding on moist rails prevented if the brake rods are not rigidly coupled with the electro-hydraulic release, but mounted between two springs acting in opposition to each other. Thereby a gradual increase of the braking energy from zero to the maximum value is obtained.

If the apparatus should come to rest prematurely because of entering the end zone at low speed, the driving motor can be reconnected to the source by operation of the master switch. This is no longer a disadvantage nor dangerous expedient because the speed of the driving motor cannot exceed the permissible value allowed by the mechanical brake and its control.

Although in accordance with the provision of the patent statutes, the principle of this invention has been explained together with what is now considered to be the best mode of applying the principle, it will be understood that the apparatus and connections shown are merely illustrative and that the invention is not limited thereto since alterations and modifications will readily suggest themselves to persons skilled in the art without departing from the spirit of the invention or from the scope of the annexed claims.

What I claim as new and desire to secure by Letters Patent of the United States is:

1. An end zone retardation control system for traveling cranes, loading bridges and the like apparatus comprising a mechanical brake for said apparatus, electro-hydraulic operating means for said brake, means responsive to the speed of said apparatus for controlling said operating means and means independent of said speed responsive means and automatically operable in response to the position of said apparatus within the end zone for modifying the control of said brake operating means.

2. An end zone retardation control system for traveling cranes, loading bridges and the like apparatus comprising a mechanical brake for said apparatus, electro-hydraulic operating means for said brake, means responsive to a decrease in the speed of said apparatus for controlling said operating means to decrease the braking torque of said brake, and means automatically responsive to the position of said apparatus in the end zone for modifying the control of said operating means to increase said braking torque at predetermined positions in said end zone.

3. An end zone retardation control system for traveling cranes, loading bridges and the like apparatus comprising a mechanical brake for said apparatus, electro-hydraulic operating means for said brake, a control dynamo electric machine driven by said apparatus at a speed proportional to the speed of said apparatus for controlling said operating means to vary the braking torque of said brake in accordance with the speed of said apparatus, and means for modifying the control of said operating means in accordance with the position of said apparatus in the end zone.

4. An end zone retardation control system for traveling cranes, loading bridges and the like apparatus comprising a mechanical brake for said apparatus, electro-hydraulic operating means for said brake, a control dynamo electric machine driven by said apparatus at a speed proportional to the speed of said apparatus for controlling said operating means to vary the braking torque of said brake in accordance with the speed of said apparatus, means for modifying the control of said operating means in accordance with the position of said apparatus in the end zone comprising means for controlling the excitation of said control machine to increase the braking torque at predetermined points in the end zone.

5. An end zone retardation control system for traveling cranes, loading bridges, and the like apparatus, comprising in combination, said apparatus, a mechanical brake for said apparatus, electric means including a motor for operating said brake, a source of supply for energizing said motor, a control dynamo electric machine driven by said apparatus at a speed proportional to the speed of said apparatus, and means responsive to the position of said apparatus for connecting said dynamo electric machine in circuit with said motor and said source of supply therefor to vary the speed of said motor in accordance with the speed of said dynamo electric machine and thereby control the braking torque of said brake in accordance with the speed of said apparatus.

KARL SCHIEBELER.